United States Patent
Ruopp

(10) Patent No.: US 7,828,123 B2
(45) Date of Patent: Nov. 9, 2010

(54) CALIPER AND BRAKE LINING FOR A BRAKE CALIPER

(75) Inventor: Michael Ruopp, Berghülen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 587 days.

(21) Appl. No.: 11/813,725

(22) PCT Filed: Jan. 12, 2006

(86) PCT No.: PCT/EP2006/000240
§ 371 (c)(1),
(2), (4) Date: Jul. 11, 2007

(87) PCT Pub. No.: WO2006/074936
PCT Pub. Date: Jul. 20, 2006

(65) Prior Publication Data
US 2008/0128224 A1 Jun. 5, 2008

(30) Foreign Application Priority Data
Jan. 12, 2005 (DE) .................. 10 2005 001 482

(51) Int. Cl.
*F16D 65/38* (2006.01)
(52) U.S. Cl. .................. 188/73.36; 188/73.38
(58) Field of Classification Search ... 188/73.36–73.38, 188/250 B, 250 D, 250 E, 250 G
See application file for complete search history.

(56) References Cited

U.S. PATENT DOCUMENTS

| 4,460,071 A | 7/1984 | Seki |
| 4,505,361 A | 3/1985 | Thomas |
| 4,537,292 A | 8/1985 | Tamura |
| 5,875,873 A * | 3/1999 | Kay et al. ................. 188/73.38 |

FOREIGN PATENT DOCUMENTS

| DE | 1 480 356 | 10/1969 |
| DE | 10 2005 001 482 A1 | 7/2006 |
| EP | 0 119 466 A1 | 2/1984 |
| WO | 2004/076885 A1 | 9/2004 |

* cited by examiner

*Primary Examiner*—Melanie Torres Williams
(74) *Attorney, Agent, or Firm*—Alan Kamrath; Kamrath & Associates PA

(57) ABSTRACT

A brake calliper for a disc brake, in particular for motor cycles and/or bicycles, includes a housing (30) for accommodating brake linings (40) which grip a brake disc during braking, with the housing having an abutment area (33) for contact with the brake linings during braking in the forward direction of travel and an assembly opening (29) which is opposite the abutment area (33) and through which the brake linings (40) can be inserted into the housing (30). A brake lining securing device (50) secures the brake linings in the housing (30) on the side opposite the abutment area (33), and a brake lining support device (31) supports the brake linings (40) between the abutment area (33) and the brake lining securing device (50). The brake linings can be arranged so that firstly the danger of undesired blocking during the braking process and secondly the danger of vibration of the brake during driving are substantially reduced. Specifically, the brake calliper has a prestressing device (32) which prestresses a brake lining (40) inserted into the housing (30) in a defined position.

46 Claims, 6 Drawing Sheets

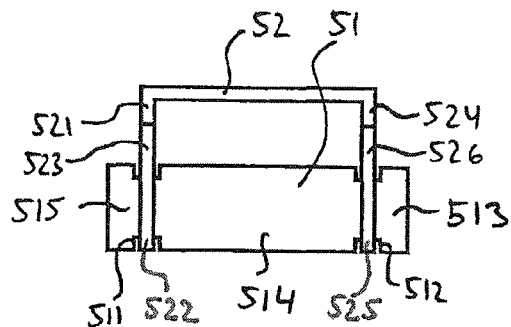
Fig. 10
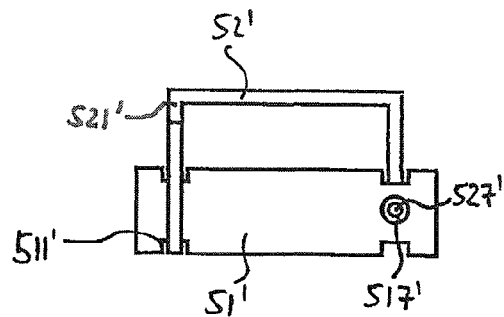
Fig. 12
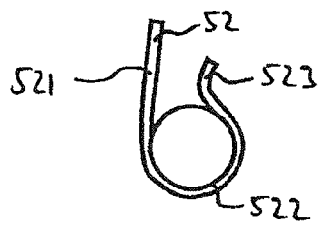
Fig. 11
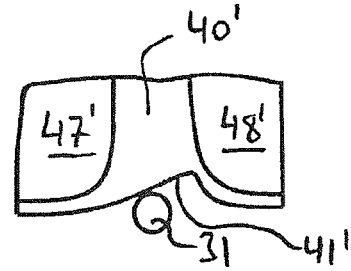
Fig. 13
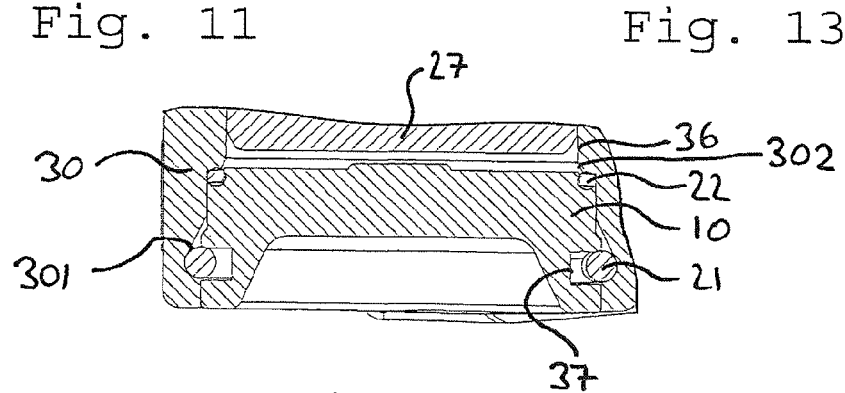
Fig. 14
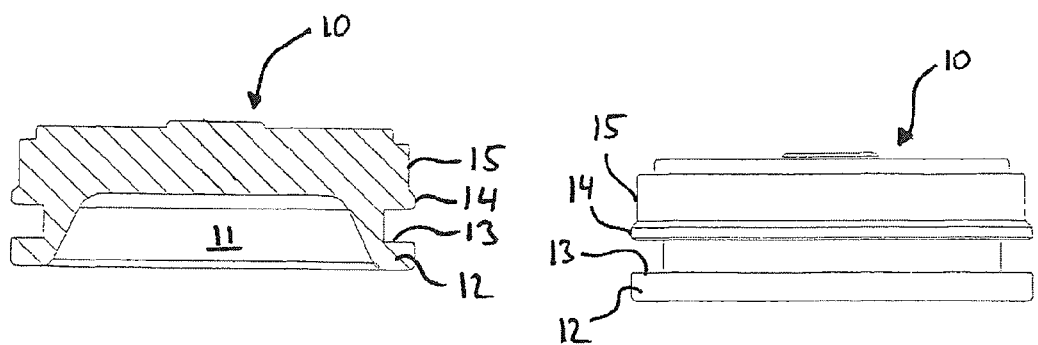
Fig. 15
Fig. 16

CALIPER AND BRAKE LINING FOR A BRAKE CALIPER

The present invention relates to a brake calliper.

The German laid-open application DE 148 356 A discloses a brake calliper. In the case of the known brake calliper, the brake lining has a substantially circular section which, on braking, is supported on an abutment area which is in the form of a segment of a circle and simultaneously supports the brake lining underneath as a brake lining support device. On the side opposite the abutment area, the brake lining has an arm with a receptacle opening in which a bolt for securing the brake lining in the housing is arranged. The known brake calliper has the disadvantage that, owing to the thermal expansion of the brake lining as a result of braking, the brake lining becomes jammed between the bolt and the abutment area so that there is a considerable danger of seizing of the brake linings and of associated blocking of the brake.

WO 2004/076885 A1 likewise discloses a brake calliper. The receptacle opening of the brake lining, in which opening a bolt for securing the brake lining in the housing is arranged, has a slot for compensating for the thermal expansion of the brake lining during braking. This known brake calliper has the disadvantage that the brake lining oscillates during driving and may vibrate, which is undesired and troublesome owing to the associated development of noise.

It is therefore the subject of the invention to provide a brake calliper in which the brake lining can be arranged so that firstly the danger of undesired blocking during the braking process and secondly the substantially reduced.

This object of the invention is achieved by a brake calliper according to the advantageous developments of the invention.

According to an embodiment of the invention, the brake calliper for a disc brake, in particular for motor cycles and/or bicycles, comprises a housing for accommodating brake linings which grip a brake disc during braking, with the housing having an abutment area for contact with the brake lining during braking in the forward direction of travel and an assembly opening which is opposite the abutment area and through which the brake linings can be inserted into the housing, a brake lining securing device for securing the brake linings in the housing on the side opposite the abutment area, a brake lining support device for supporting the brake linings between the abutment area and the brake lining securing device, and a prestressing device which is formed so that it prestresses a brake lining inserted into the housing in a defined position.

This brake calliper has the advantage that the brake linings can be arranged in the housing with the brake lining securing device with play for compensating for the thermal expansion occurring during braking, and at the same time the prestressing device ensures that the brake linings are always arranged in a defined position, i.e. preferably resting against the abutment area, so that no undesired oscillations and associated noises occur during driving. It is clear that the prestressing force of the prestressing device should be chosen so that firstly the brake lining is not removed from the abutment area in the case of shocks occurring during driving and secondly is not so large that there is a danger of seizing of the brake lining due to static friction between the abutment area and the brake lining. For this purpose, the prestressing device is formed in such a way that it prestresses a brake lining inserted into the housing in a defined position.

preferably, a brake lining inserted into the brake calliper is prestressed against the abutment area and the brake lining support device by the prestressing device. For this purpose, for example, the prestressing device can be arranged above the brake lining and can exert a force on the brake lining in the direction of the brake lining support device. The brake lining and the lining support device are preferably formed in such a way that the brake lining is prestressed in the direction of the abutment area. Advantageously, the prestressing device according to an embodiment of the invention comprises a spring device which grips the top of a brake lining inserted into the housing. The prestressing device may comprise, for example, a leaf spring or preferably may comprise a plurality of leaf springs which in each case grip a brake lining inserted into the housing.

According to the invention, the prestressing device can be formed in such a way that it prestresses a brake lining inserted into the brake calliper against the abutment area and the brake lining support device.

According to the invention, the prestressing device can be formed so that it exerts, on a brake lining inserted into the brake calliper, a force which is substantially in the direction of the brake lining support device. Preferably, the prestressing device may comprise for this purpose a spring device which grips the top of a brake lining inserted into the housing. Advantageously, the prestressing device may comprise one or more leaf springs which grip the top of the brake linings inserted into the housing. These embodiments of the invention have the advantage that, during mounting of the brake linings, the brake linings snap in or engage with a noise behind the brake lining securing device and give the user a clear signal regarding the correct positioning of the brake linings.

Advantageously, the prestressing device may be arranged in a circumferential direction of a brake disc accommodated in the housing, approximately in the middle between the abutment area and the brake lining securing device.

Advantageously, the brake lining support device can be formed so that a brake lining inserted into the housing is prestressed in the direction of the abutment area by the force exerted by the prestressing device on the brake lining.

According to an alternative development of the invention, the prestressing device can be formed so that it exerts, on a brake lining inserted into the brake calliper, a force which is substantially in the direction of the abutment area. The prestressing device may comprise a spring device which grips the brake lining on that side of a brake lining inserted into the brake calliper which is opposite the abutment area. Advantageously, the abutment area can be inclined so that a brake lining prestressed against the abutment area is prestressed against the brake lining support device.

According to an alternative development of the invention, the prestressing device can be formed so that it exerts, on a brake lining inserted into the brake calliper, a force which has a first force component which is substantially in the direction of the brake lining support device and a second force component which is substantially in the direction of the abutment area. The first force component can advantageously be about 0.1 to about 10 times, preferably about 0.5 to about 5 times and preferably about twice the second force component.

In said embodiments, the prestressing device can advantageously be formed so that it is deactivated on activation of the brake. This has the advantage that, particularly on first releasing the brake, when the brake linings release the brake disc, the static friction between the brake lining and the abutment area or the brake lining support device is lower, and jamming of the brake linings is avoided. Advantageously, the brake calliper may comprise a hydraulic brake actuating mechanism, and the prestressing device may be formed so that it is deactivated by the hydraulic pressure which is built up on activation of the brake and is generated or stored also immediately after release or preferably for a short time.

According to the invention, the brake lining support device may comprise a plurality of bolts which in each case support a brake lining inserted into the housing. Alternatively or additionally, the brake lining support device may comprise a plurality of projections which in each case support a brake lining inserted into the housing. The projections may be formed integrally with the housing.

According to the invention, the brake lining support device may be arranged in the circumferential direction of a brake disc accommodated in the housing, approximately in the middle between the abutment area and the brake lining securing device. According to the invention, the brake lining support device and the prestressing device can preferably be arranged in the circumferential direction of a brake disc accommodated in the housing, substantially approximately at the same height.

According to the invention, the housing may be a forged part which is preferably in the form of a single part. The design as a forged part has the advantage that the brake calliper can be made smaller while having the same strength. This is important particularly in the motocross area, because it is then possible to arrange the brake calliper at an angle of about 15 degrees in the upward direction and to arrange it on two screw-on eyes which completely enclose the brake calliper in the circumferential direction of the brake disc. This has the advantage that there is optimal torsional strength, with, at the same time, no disturbing contour being produced below the fork base.

Alternatively, the housing may be in the form of a milled and/or cast part which is in one part, two parts or a plurality of parts.

Alternatively or additionally, the housing may have a recess which is engaged by a projection of a brake lining inserted into the housing.

Alternatively or additionally, the housing may have at least one inspection window which is engaged by a projection of a brake lining inserted into the housing, with the at least one inspection window preferably being formed so that the wear of the friction linings of a brake lining inserted into the housing is observable.

Known brake lining securing devices comprise bolts which are screwed into the housing. These brake lining securing devices have the disadvantage that they are complicated to install and may become detached. In addition, they are difficult to release in the case of severely soiled brake callipers. Furthermore, it is known that bolts for securing the brake lining can be inserted into the housing through receptacle openings in the brake lining and can be secured by a spring cotter pin. As additional securing, it is known that a spring plate which is pushed over a section of smaller diameter in the middle of the bolt can be provided in addition to the spring cotter pins arranged in grooves. This solution has the disadvantage that many parts are provided, which makes assembly complicated. Moreover, the parts can easily be lost. It is therefore also the object of the invention to provide a brake calliper which has a brake lining securing device which can be easily operated and at the same time ensures reliable securing of the brake lining in the housing of the brake calliper.

According to an embodiment of the invention, the brake calliper for a disc brake, in particular for motor cycles and/or bicycles, comprises a housing for accommodating brake linings which grip a brake disc on braking. The housing has an abutment area for contact with the brake linings during braking in the forward direction of travel, and a brake lining securing device has a bolt for securing the brake linings in the housing on the side opposite the abutment area. The brake lining securing device furthermore comprises a bow which secures the bolt to prevent it from slipping out and grips under a section of the housing for securing the bow.

This embodiment of the invention has the advantage that the bow has a dual function. Releasing of the brake lining securing device requires forces which act in different directions. This ensures reliable securing of the brake linings on the housing in combination with easy assembly.

According to the invention, the bolt may have, at one end, a groove which is engaged by the bow. The bow may have an arm section which has an arc section which engages the groove of the bolt. Preferably, the arm section of the bow may be formed to correspond to a spring cotter pin.

According to an embodiment of the invention, the bolt may have a groove at each of the two ends, and the bow may have two arm sections which are preferably of identical design and each have an arc section which engages the corresponding groove of the bolt.

According to a further embodiment of the invention, the bolt may have a groove at one end and a bore at its other end, and the bow may have an arm section which has an arc section, which engages the groove of the bolt, and an engaging section which engages the bore of the bow. This has the advantage that the bow can be more easily mounted.

Advantageously, the housing may comprise a cam behind which the bow grips for securing the bow.

According to the invention, the brake calliper may also comprise combinations of said embodiments.

The invention also relates to a brake lining for a brake calliper according to one of the preceding embodiments according to the invention, having a recess for support on the brake lining support device.

In a brake lining according to the invention, the recess can be formed so that the brake lining inserted into the housing is prestressed in the direction of the abutment area by the force exerted by a prestressing device on the brake lining.

The recess may be semi-circular. Alternatively or in addition, the recess may have a bevel which is formed so that the brake lining inserted into the housing is prestressed in the direction of the abutment area by the force exerted by the prestressing device on the brake lining. The bevel may be linear and may have an angle of about 15 to about 45 degrees, preferably about 30 degrees, to the circumferential direction of the brake disc. Alternatively or in addition, the bevel may be curvilinear and may have an inclination in an angle range between about 15 to about 45 degrees, preferably about 30 degrees, to the circumferential direction of the brake disc.

The recess may be semi-circular. Alternatively or in addition, the recess may have a bevel which is formed so that the brake lining inserted into the housing is prestressed in the direction of the abutment area by means of the force exerted by the prestressing device on the brake lining. The bevel may be linear and may have an angle of about 15 to about 45 degrees, preferably about 30 degrees, to the circumferential direction of the brake disc. Alternatively or in addition, the bevel may be curvilinear and may have an inclination in an angle range between about 15 to about 45 degrees, preferably about 30 degrees, to the circumferential direction of the brake disc.

Alternatively or in addition, the brake lining may have a projection for engaging a recess in the housing of a brake calliper. The projection may be arranged on one side of the brake lining. Alternatively or in addition, the projection may be arranged substantially in the middle, preferably in the upper region of the brake lining.

The invention also relates to a brake calliper according to the above embodiments in combination with the brake linings according to the invention and according to the above embodiments.

The invention also relates to the housing of a brake calliper according to the above embodiments.

The embodiments according to the invention of the brake calliper may additionally comprise a housing in which a disc space for accommodating a brake disc and a brake cylinder for accommodating a brake piston are formed. The brake cylinder is connected to the disc space and has, on its side opposite the disc space, an assembly opening through which the brake piston can be inserted into the brake cylinder, a closure element for closing the assembly opening after insertion of the brake piston into the brake cylinder, and a securing element for securing the closure element in the assembly opening with respect to forces in the direction of the main axis of the brake cylinder. The housing and the closure element enclose the securing element.

This further development of the brake callipers according to the invention has the advantage that the mounting of the closure element is substantially simplified compared with the prior art and is therefore more economical because no screwing in and no torque monitoring during screwing in of the closure element are required. Moreover, there is the advantage that the closure element can no longer become detached owing to loads due to the pressure change in the system itself. Further advantages are that the closure element can no longer be removed and that the brake calliper cannot be accidentally damaged.

According to an embodiment of the invention, the closure element can be arranged in the housing with a press fit. A press fit withstands as a rule pressure of more than 40 bar. 40 bar is also a customary operating pressure of the brake. During full braking, pressures of up to 80 bar occur. During testing, pressures of up to 250 bar are applied. In the embodiments of the invention with the closure element, the securing element is therefore necessary in order to ensure secure closure of the assembly opening. If the closure element and the housing have different coefficients of thermal expansion, for example owing to a different choice of material, the securing element is likewise required for ensuring reliable closing of the assembly opening.

According to the invention, the securing element may be elastic. It can preferably be integrated into the closure element. For example, the closure element may be double-walled, with the closure element preferably having ribs, spring elements or elastic elements which are suitably arranged between the elastic outer wall and the inner wall. For example, the closure element may also be elastic as a whole. Alternatively or in addition, one or more barb-like element can be provided on the closure element. Alternatively or in addition, it is also possible to provide a screen-like element or an element in the form of a screen edge on the closure element.

According to a preferred embodiment of the invention, the securing element is a circlip. This embodiment makes it possible to achieve a particularly simple design. Assembly is likewise very simple, because the circlip need only spring into place for securing the closure element.

A groove for accommodating the securing element may preferably be provided in the assembly opening. Accordingly, the closure element may have a groove for accommodating the securing element.

According to an embodiment of the invention, a shoulder for supporting the closure element may be provided in the housing, in the region of the assembly opening. A seal may be provided between the shoulder and the closure element.realized way, the sealing of the pressure space of the brake cylinder can be realized in a simple and reliable manner.

According to an embodiment of the invention, a further brake cylinder for accommodating a further brake piston which is arranged coaxially with the other brake cylinder is provided on that side of the disc space which is opposite the assembly opening. During assembly, all brake pistons (and seals) are preferably inserted through the assembly opening before the assembly opening is closed by the closure element.

For safety reasons, it is advantageous if the closure element and the securing element are no longer removable after the mounting of the closure element in the housing.

According to a preferred embodiment of the invention, a further brake cylinder is provided for accommodating a further brake piston, which brake cylinder is arranged next to the other brake cylinder, with a closure element and a securing element according to the invention being provided.

The brake calliper according to the invention preferably has a plurality of pairs, particularly preferably two pairs, of brake cylinders, with, in each case, a closure element and securing element according to the invention being provided on one side of the brake calliper for each pair of brake cylinders.

Advantageously, the housing of the brake calliper according to the invention is a forged part. Compared with housings comprising cast or milled parts, this has the advantage that the brake calliper can be made smaller while having the same strength. In particular, sufficient strength in the region of the assembly opening for accommodating the securing element (circlip) can be achieved for absorbing the forces occurring during braking.

The invention also relates to a combination of a brake calliper and a fork base.

A combination of a brake cylinder and a fork base is disclosed, for example, in WO 2004/076270 A1. In the known combination, the housing of the brake calliper has a screw-on eye arranged in the middle and has a screw-on eye arranged on the side. The two brake cylinders are provided on both sides of the centrally arranged screw-on eye, viewed in the circumferential direction of a brake disc arranged partly in the housing. This has the disadvantage that, on transmission of the forces occurring during braking, strong torsional forces act from the brake calliper on the fork base. The connection therefore has to have large dimensions, which results in a greater weight and a larger required construction space.

It is therefore also the object of the invention to provide a combination of brake calliper and fork base which is particularly compact and has high torsional strength.

According to an embodiment of the invention, in a combination of a brake calliper with a fork base, the construction is such that the brake calliper is arranged above the lower edge of the fork base, and the housing of the brake calliper has one or more brake cylinders and at least two screw-on eyes which are arranged so that the brake cylinder or cylinders lie between the screw-on eyes, viewed in the circumferential direction of a brake disc arranged in the brake calliper.

This results in the advantage of very high torsional strength of the connection between the brake calliper and the fork base.

Advantageously, the brake calliper may have the above-mentioned features.

According to the invention, the brake calliper may be arranged on the fork base, swiveled upwards at an angle ($\alpha$) relative to the horizontal. Advantageously, the angle is about 0 to about 45°, preferably about 10 to about 30° and particularly preferably about 15°.

According to the invention, the housing of the brake calliper may be a forged, milled and/or cast part.

According to the invention, the fork base may have, between the screw-on eyes, an edge for accommodating the housing of the brake calliper, the edge preferably corresponding substantially to the contour of the housing. This makes it possible to achieve even better torsional strength. Advantageously, an interlocking and/or frictional connection can be formed between the edge of the fork base and the contour of the brake calliper.

According to the invention, the housing of the brake calliper and the fork base can be formed so that, in the assembled state, there is extensive contact between the opposite surfaces of the housing and of the fork base. This has the further advantage that good conduction of the heat generated during braking from the brake calliper via the fork base to the fork is permitted.

The brake calliper according to the invention and Combination according to the invention are advantageous in particular for motocross motorcycles, because a limited construction space is present there, and the brake calliper should, as far as possible, not be arranged below the fork base, in order to avoid contact with the ground. In particular, the developments according to the invention are advantageous for brakes having brake discs which have a diameter of less than 290 mm and, in particular, a diameter in the range from 200 to 280 mm, because the construction space is very limited in the case of such brakes.

Below, a brake calliper according to the invention and brake linings according to the invention and a combination according to the invention of brake calliper and fork base are described more exactly with reference to working examples of the invention which are shown in the figures.

FIG. 10 shows a detailed view of the bow and of the bolt of the brake lining securing device of the brake calliper of FIG. 1 from a direction corresponding to FIG. 4.

FIG. 11 shows a detailed view of the bow and of the bolt of the brake lining fixing device of the brake calliper of FIG. 1 from a direction corresponding to FIG. 5.

FIG. 12 shows a detailed view of the bow and of the bolt of a brake lining fixing device according to an alternative embodiment according to the invention.

FIG. 13 shows a partial view of the support section of a brake calliper according to the invention and of the bottom of an alternative brake lining according to the invention.

FIG. 14 shows a partial sectional view through a brake cylinder with a closure element of the brake calliper of FIG. 1.

FIG. 15 shows a section through the closure element of the brake calliper of FIG. 14.

FIG. 16 shows a side view of the closure element of FIG. 15.

Figure 1:
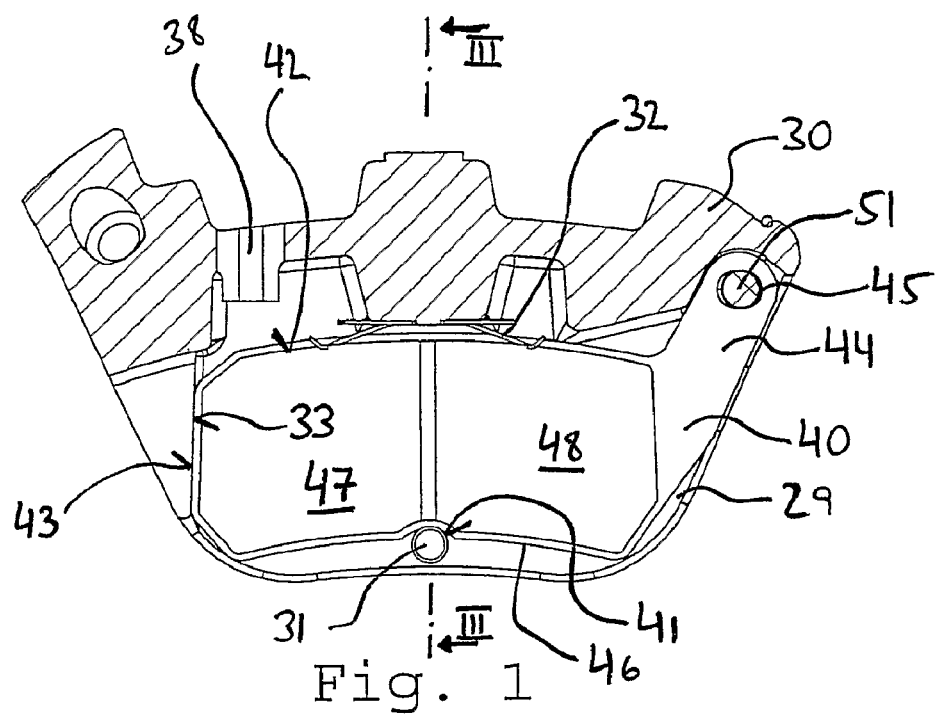
FIG. 1 shows a section through a brake calliper according to the invention, along the line I-I of FIG. 2.
Figure 2:
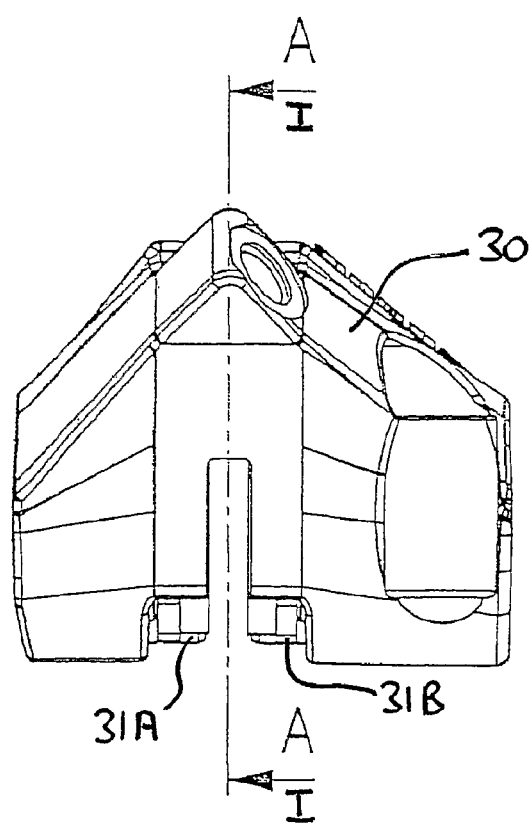
FIG. 2 shows a front view of the brake calliper of FIG. 1.

The following reference numerals are used:

10 Closure element
10A Closure element
10B Closure element
11 Recess
12 Outer wall
13 Groove
14 Section
15 Section
21 Securing element
22 Seal
27 Brake piston
29 Assembly opening (for brake lining)
30 Housing
301 Recess
302 Shoulder
303 Screw-on eye
304 Screw-on eye
31 Brake lining support device
31A Bolt
311A Main section
312A Top section
31B Bolt
32 Prestressing device
33 Abutment area
34 Bore
35 Wider region
36 Brake cylinder
37 Groove
38 Maintenance opening
39 Direction of rotation of the brake disc (forward travel)
139 Recess
139A; 139B Inspection window
40; 40' Brake lining
41 Recess (semi-circular)
41' Recess (bevel)
141 Recess (asymmetrical)
42 Top
43 Front
44 Arm
45 Receptacle opening
46 Bottom
47, 47' Friction lining
48, 48' Friction lining
49; 49A; 49B Projection
50 Brake lining securing device
51; 51' Securing bolt
511; 511' Groove
512 Groove
513 Top section
514 Main section
515 Top section
517' Bore
52; 52' Bow
521; 521' Arm section
522; 522' Arc section
523; 523' Actuation section
524 Arm section
525 Arc section
526 Actuation section
527' Engaging section
53 Cam
60 Fork base 61 Fork receptacle
62 Axle receptacle
63 Receptacle
64 Receptacle FIG. 1 shows a section through a brake calliper according to the invention, along the line I-I of FIG. 2.

The brake calliper according to the invention comprises a housing 30 in which a brake lining 40 is accommodated. The housing 30 has, on its left side in FIG. 1, an abutment area 33 on which the brake lining 40 is supported with its front 43. The abutment area 33 and the front 43 of the brake lining 40 are formed so that extensive contact of the brake lining 40 with the abutment area 33 is achieved.

The brake lining 40 has an arm 44 with a receptacle opening 45 in which a bolt 51 of a brake lining securing device 50 shown in detail in FIGS. 10 and 11 is arranged and secures the brake lining 40 in the housing 30. The abutment area 33 is inclined so that the brake lining 40 could rotate about the receptacle opening 45 downwards and out of the housing 30. In order to secure the brake lining 40 to prevent it from being rotated out, a brake lining support device 31 which supports the brake lining 40 at its bottom 46 is provided in the lower region on the housing 30. A recess 41 which is engaged by the brake lining support device 31 is provided in the bottom 46.

In order to prestress the brake lining 40 in a defined position in the housing 30, a prestressing device 32 which grips the top 42 of the brake lining 40 is provided. The prestressing device 32 presses the brake lining 40 with the arc-shaped recess 41 against the brake lining support device 31. Owing to the arc-shaped formation of the recess 41, the brake lining 40 is pressed with its front 43 against the abutment area 33.

According to an alternative embodiment of the invention which is not shown, the prestressing device 32 could also be provided on that side of the housing 30 which is opposite the abutment area 33 and could prestress the brake lining 40 in the direction of the abutment area 33. Owing to the oblique arrangement of the abutment area 33, the brake lining 40 is prestressed against the brake lining support device 31.

According to a further alternative device, it is also possible to provide a prestressing device 32 which prestresses the brake lining 40 against the brake lining support device 31 with one force component and against the abutment area 33 with a further force component.

The bolt 51 is arranged in the receptacle opening 45 of the brake lining 40 with play, in order to provide compensation for the thermal expansion of the brake lining 40 at the temperatures during braking, which are considerable in some cases. The play is particularly important for avoiding seizing of the brake lining during braking. FIG. 1 shows the brake calliper according to the invention in the cold state, i.e. the play in the receptacle opening 45 is provided substantially on the left of the bolt 51. On heating the brake lining 40, the brake lining 40 expands and can deviate to the right in FIG. 1. The recess 41 shifts towards the brake lining support device 31 so that, owing to the semi-circular design of the recess 41, the brake lining 40 is also pressed somewhat upwards against the prestressing device 32. The brake lining 40 is simultaneously pressed by the prestressing device 32 towards the left against the abutment area 33 owing to the semi-circular design of the recess 41.

The brake lining 40 has two friction linings 47, 48 which are pressed in a known manner during the braking process against a brake disc accommodated in the housing 30. The housing 30 has a maintenance opening 38 to enable the wear of the friction linings to be detected more easily and to enable the contact surface of the friction linings to be seen and, if necessary, to be cleaned.

The brake calliper shown has two brake linings 40 which are mirror images of one another and, on braking, act from both sides on the brake disc accommodated in the housing 30. As shown in FIG. 2, the brake lining support device 31 comprises two opposite bolts 31A, 31B for supporting one brake lining 40 each.

Figure 3:
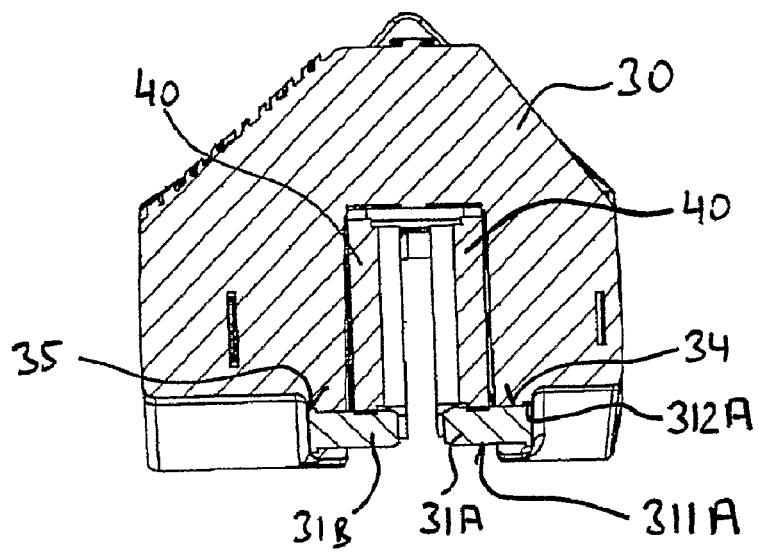
FIG. 3 shows a section through the brake calliper of FIG. 1, along the line III-III of FIG. 1.

FIG. 3 shows a section through the brake calliper of FIG. 1, along the line III-III of FIG. 1. In FIG. 3, the arrangement of the bolts 31A, 31B in the housing 30 is evident. The bolts 31A and 31B are in the form of mirror images of one another. The design is explained by way of example for the bolt 31A. The bolt 31A has a main section 311A and a top section 312A which has a slightly larger diameter. The bolt 31A is accommodated in a bore 34 which has a wider region 35 in the region of the top section 312A. The bolt 31A is inserted into the bore 34 with a press fit, and the material of the housing 30 is worked for securing the bolt 31A via the top section 312A.

For installing the brake lining 40 in the housing, the brake linings 40 in FIG. 1 are inserted from the right into the brake calliper. The brake lining 40 is pressed via the brake lining support device 31 upwards against the prestressing device 32. As soon as the brake lining 40 has reached its end position, it is pressed by the prestressing device 32 into the semi-circular recess 41 of the lining 40 against the brake lining support device 31. There is a "snapping-in" or "engagement" of the brake lining 40 associated with a noise, and hence a clear indication to the user. The linings 40 are then pierced by the bolt 51. For securing the bolt 51, a bow 52 is arranged grooves 511, 512 provided at the ends of the bolt 51. The bow 52 is then pushed over the cam 53 formed on the housing 30 and engages there. This results in double securing of the bolt 51, which is realized in the dual function of the bow 52.

Figure 4:
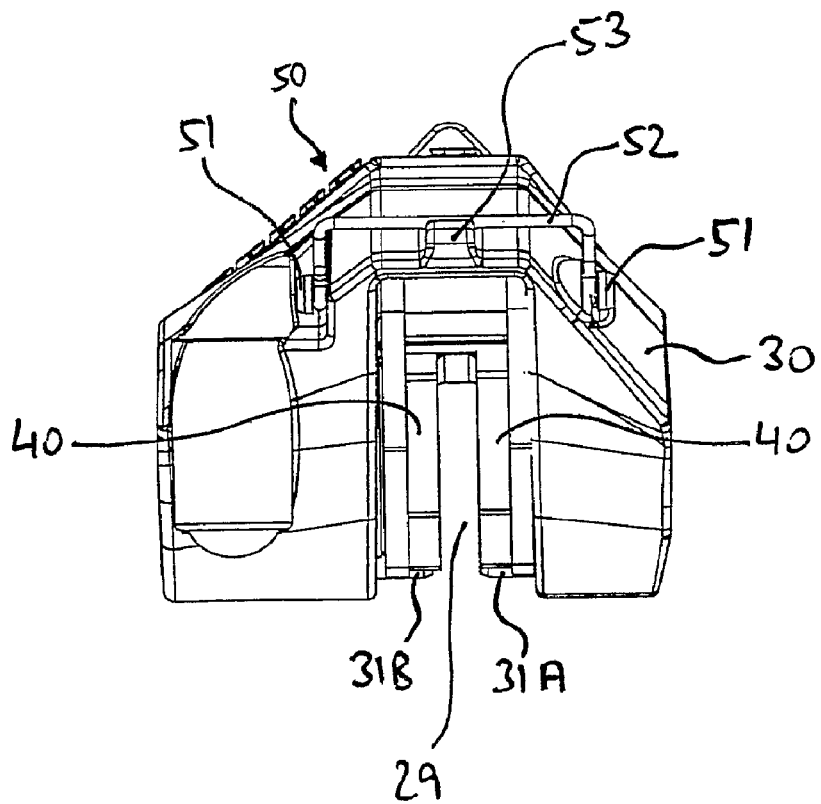
FIG. 4 shows a rear view of the brake calliper of FIG. 1.

FIG. 4 shows a rear view of the brake calliper of FIG. 1. The brake linings 40 are introduced into the housing 30 through the assembly opening 29. The cam 53 of the brake lining securing device 50 is provided above the assembly opening 29. The brake lining securing device 50 comprises the bolt 51, which is secured by the bow 52 and is described in detail in FIGS. 10 and 11.

Figure 5:
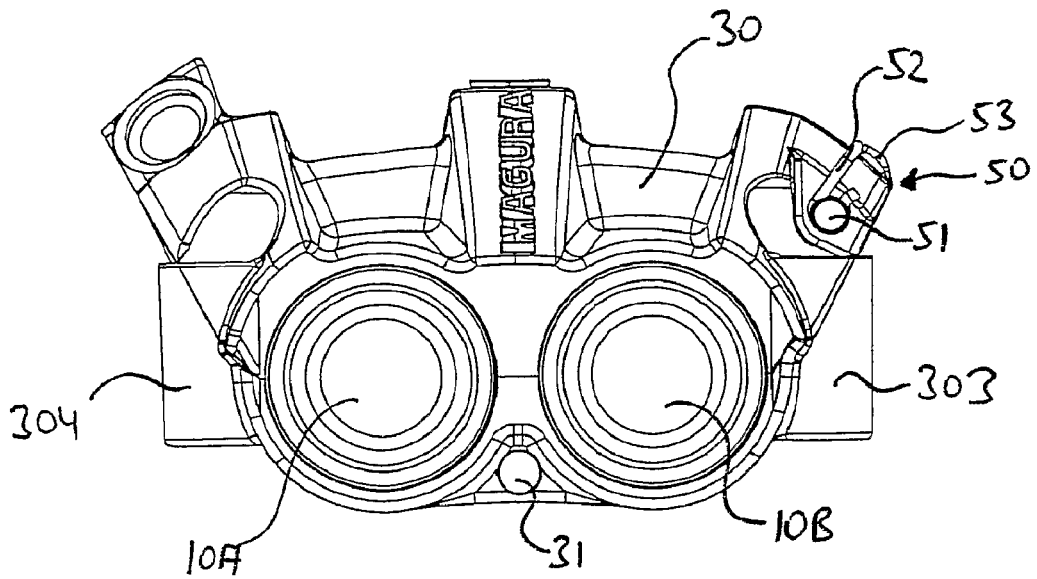
FIG. 5 shows a side view of the brake calliper of FIG. 1.

FIG. 5 shows a side view of the brake calliper of FIG. 1. The brake calliper comprises two pairs of brake pistons, which are designed in a known manner. The brake cylinders have an open end which is closed by one closure element 10A and 10B, respectively, each. The formation of the closure element is described in detail in FIGS. 14 to 16.

Figure 6:
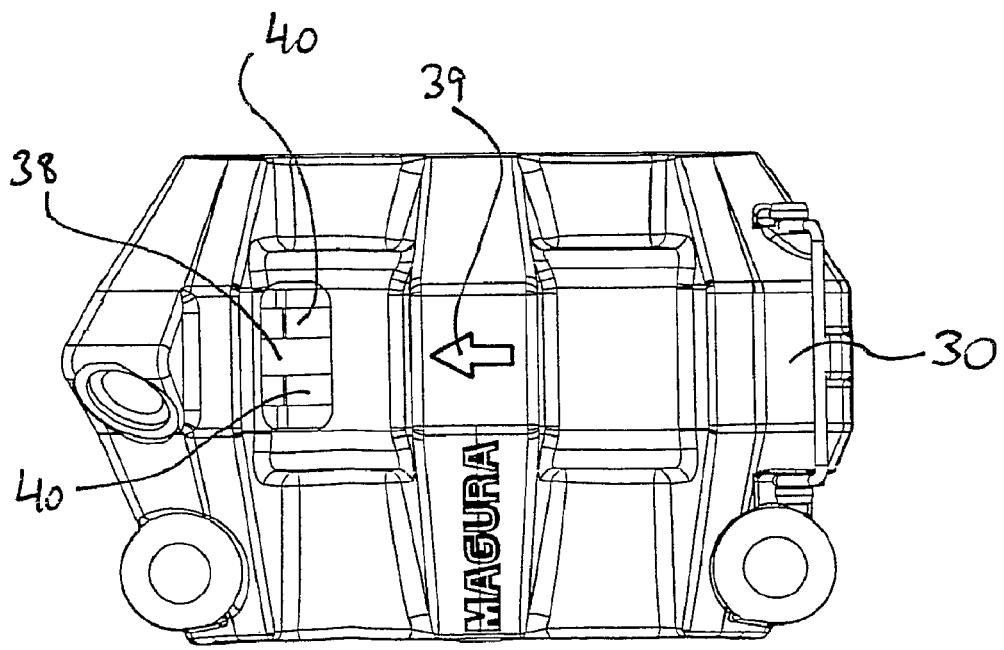
FIG. 6 shows a view of the brake calliper of FIG. 1 from above.

FIG. 6 shows a view of the brake calliper of FIG. 1 from above. The direction of rotation of the brake disc during travel in the forward direction is indicated by the arrow 39. The wear of the friction linings can be easily detected through the maintenance opening 38, and the contact surface of the linings can be seen and cleaned.

Figure 1A:
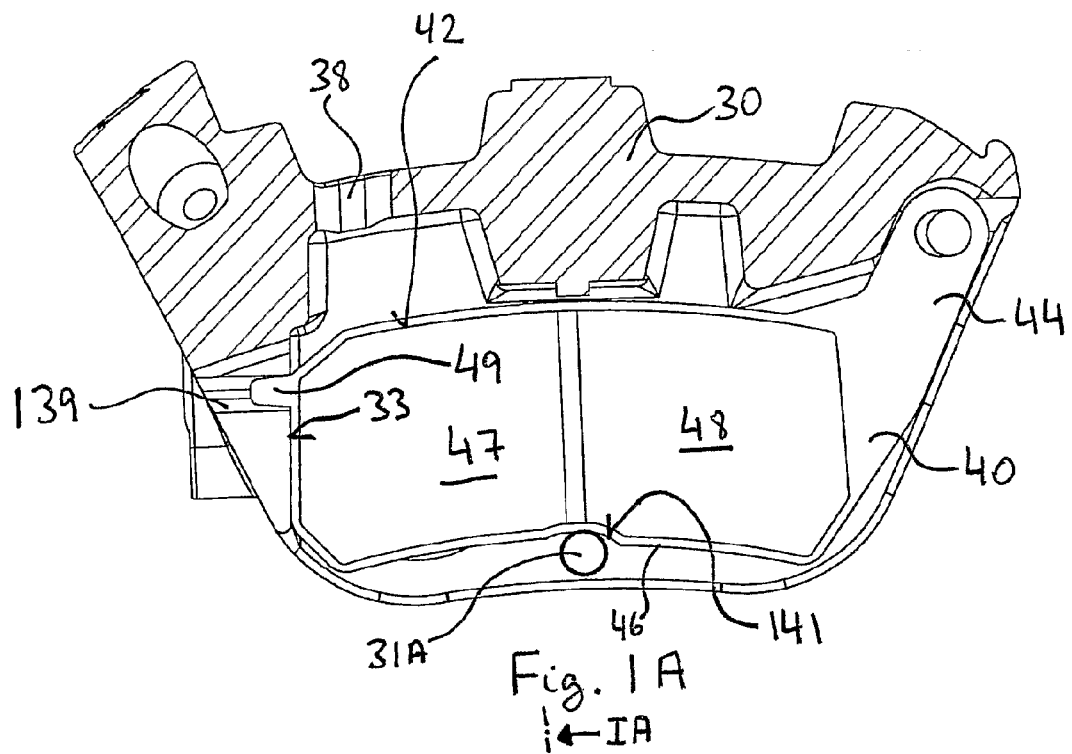
FIG. 1A shows a section through a further brake calliper according to the invention, along the line IA-IA of FIG. 2A.
Figure 2A:
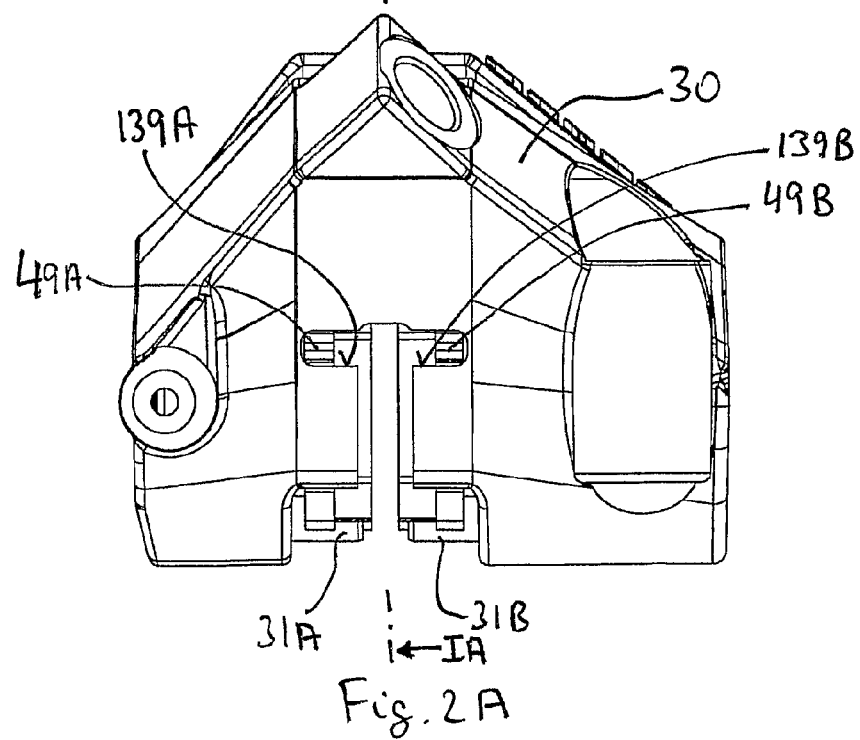
FIG. 2A shows a front view of the brake calliper of FIG. 1A.

FIGS. 1A and 2A show a further brake calliper according to the invention, which substantially corresponds to the brake calliper shown in FIGS. 1 to 6. Substantially the same reference numerals are therefore used for identical features, reference is made to the above description, and substantially only the differences are described below.

For the sake of clarity, the pre-stressing device 32 in was not shown in FIG. 1A.

The recess 141 is formed asymmetrically. This formation has the advantage that the lining can be more easily replaced.

On the left side, the lining 40 has a projection 49 which engages a recess 139 in the housing. Preferably, the projection 49 or 49A, 49B does not rest against the housing 30 but is at least a small distance away. The projection 49 serves as a securing element for the unusual case where, owing to an extreme load or exceptional situation, the brake lining support device 31 (a bolt 31A mounted on one side or the bolt 31B in this embodiment) becomes detached. In this case, the projection 49A, 49B rests against the housing 30 in the recess 139 and swiveling down of the brake lining is reliably prevented.

In the embodiment shown, the recess 139 is formed so as to be continuous, so that the housing 30 has an inspection window 139A and an inspection window 139B, as shown in FIG. 2A. The inspection window thus preferably performs the dual function. Firstly, the projections 49A, 49B of the two brake linings 40 can be supported on the inspection window, for example in the case of failure of at least one bolt 31A; 31B. Secondly, the wear of the friction lining 47, 48 can be monitored through the inspection window. For example, as shown in FIG. 2A, both the projection and the friction lining may be visible through the inspection window. Alternatively or in addition, the inspection window may have a mark which indicates the maximum permissible wear of the friction linings or the remaining thickness of the friction linings 47, 48. For this purpose, for example, an edge can be provided at the height of the support plate. In this embodiment, it is also possible to dispense with the maintenance opening 38, because the inspection window can perform the function of the maintenance opening 38.

In addition or alternatively to the projection 49 and the recess 139, corresponding securement can be provided according to embodiments of the invention which are not shown. For example, the lining can be suspended in the middle, for example, in the spring or the maintenance opening. For this purpose, the lining may have suitably formed projections. Alternatively or in addition, it is also possible to provide a bolt above or preferably outside the region in which the brake disc which is not shown engages, which bolt is engaged by the brake lining with a correspondingly formed projection. For this embodiment, the bolts 31A and 31B can also be omitted, and the lining can be clamped against the bolts. These bolts may also serve, for example, for the suspension or fastening of the springs.

Figure 7:
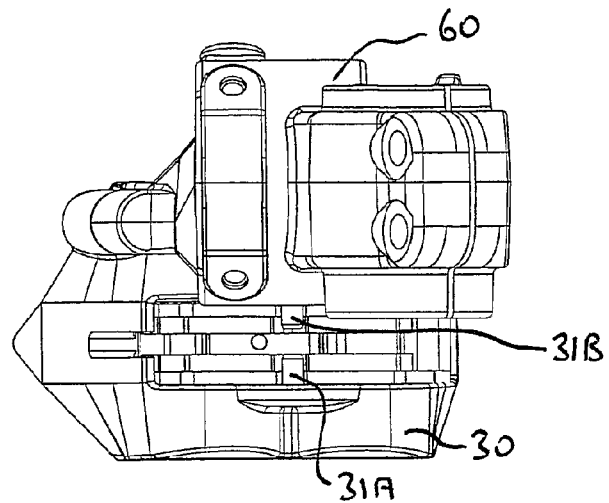
FIG. 7 shows a view of the brake calliper of FIG. 1 in combination with a fork base from the front (relative to the vehicle).
Figures 8, 9:
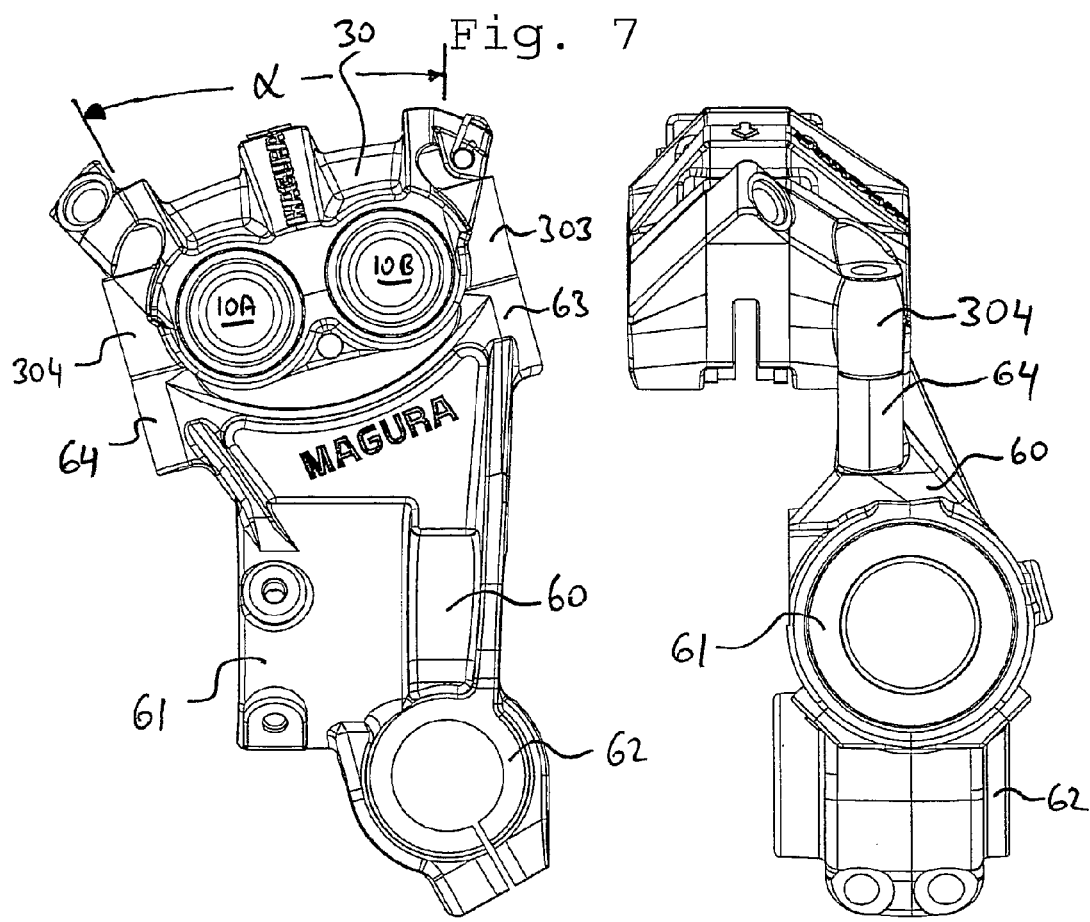
FIG. 8 shows a view of the combination of FIG. 7 of brake calliper and fork base from the side.
FIG. 9 shows a view of the combination of FIG. 7 of brake calliper and fork base from above (relative to the vehicle).

FIGS. 7 to 9 show the brake calliper of FIG. 1 in combination with a fork base. FIG. 7 shows the combination from below, FIG. 8 from the side and FIG. 9 from the front. The fork base 60 comprises a fork receptacle 61 and an axle receptacle 62 which are formed in a known manner. The brake calliper is connected to the fork base 60 via two bolt and/or screw connections which engage the front and back of the housing. The housing 30 has a screw-on eye 304 on the front and a corresponding screw-on eye 303 on the back. The fork base has corresponding receptacles 63, 64 in which are provided bolts or threads which are not shown and which engage the screw-on eyes 303 or 304 in a known manner. The screw-on eyes 303 and 304 are provided at opposite ends of the brake calliper 30, viewed in the circumferential direction of the brake disc. Since the screw-on eyes 303 and 304 enclose the brake cylinders provided in the housing of the brake calliper, the connection has optimal rigidity.

Construction of the fork base 60 is such that the brake calliper can be positioned at an angle α=about 0 to about 45°, preferably α=about 10 to about 30° and particularly preferably α=about 15° in an upward direction. The upward-directed construction is necessary in order to avoid producing on the bottom of the fork a disturbing contour which is lower than the fork base 60. This is very important particularly in motocross motor cycles in which the brake could otherwise come into contact with obstacles on the ground.

FIG. 10 shows a detailed view of the bow 52 and of the bolt 51 of the brake lining securing device 50 of the brake calliper of FIG. 1 from a direction corresponding to FIG. 4. The bolt 51 comprises a main section 514 and two top sections 515 and 513, respectively, which are separated from the main section 514 by one groove 511 and 512, respectively, in each case. The bow 52 comprises, on its sides, in each case, an arm section 521 and 524, which are formed similarly to a spring cotter pin. The arm sections 521 and 524 each comprise an arc section 522 and 525, respectively, which becomes an actuation section 523 and 526, respectively.

For securing the brake linings in the housing, the bolt 51 is inserted into the housing 30 through the receptacle openings 45 of the brake linings 40 and secured with the bow 52 (cf. FIGS. 1 and 4). For this purpose, the arm sections 521 and 524 are caused to engage the grooves 511, 512, and the bow 52 is rotated over the cam 53.

FIG. 12 shows an alternative formation of the brake lining securing device 50. The bow 52' is formed on its left side in FIG. 12 to correspond to FIGS. 10 and 11, the description of which is referred to. On its right side in FIG. 12, the bow 52' has an engagement section 527' which is suspended in a bore 517' in the bolt 51'. For mounting the securing bow 52', the bow 52' is suspended with the engagement section 527' in the bore 517' and arranged above the cam 53. The arm section 521' is then caused to engage the groove 511'.

FIG. 13 shows an alternative of a brake lining 40' according to the invention. The brake lining 40' is formed substantially like the brake lining 40 shown in FIG. 1, the description of which is referred to. Below, only the differences will be described.

The brake lining 40' has two friction linings 47', 48' and a differently formed recess 41'. The recess 41' has a bevel which is inclined so that the brake lining 40' is prestressed by the prestressing device 32 in the direction of the abutment area 33. The angle of the bevel of the recess 41' should not be chosen to be too steep, in order to avoid jamming of the lining. It also should not be chosen to be too shallow, in order to avoid a high frictional force so that no prestressing takes place. It is within the skill of the person skilled in the art to determine the suitable inclination. The recess 41' may be curvilinear or linear. It is assumed at present that an angle in the range from 30 to 45.degree. is more suitable. On the basis of experiments, it would be possible to determine whether larger or smaller angles are likewise suitable.

FIGS. 14 to 16 show he design of the closure element 10 for the open ends of the brake cylinders.

FIG. 14 shows a partial cross-section through a housing of a brake calliper according to the invention and, particularly, through a brake cylinder. The housing 30 has two brake cylinders 36 in each of which a brake piston 27 is arranged (only one is shown in each case). The brake pistons 27 are arranged on opposite sides of the brake disc and are subjected in a known manner to pressure during braking in order to press the brake linings against the brake disc. The cylinder walls are provided with grooves which accommodate square seals which seal the brake cylinder 36 and cause the brake pistons to be withdrawn in a known manner after braking.

The housing of the brake calliper is preferably a forged part. The brake cylinders 36 are formed by machining. One cylinder remains open to the outside as a result of machining. After the insertion of the brake piston, the brake cylinder is closed by the closure element 10, 10A, 10B. The closure element 10 has a groove 13 in which a securing element 21 is arranged. The housing 30 has a recess 301 which is engaged in part by the securing element 21. The securing element 21 secures the closure element 10 in the housing 30, in particular during braking, if pressure is built up in the cylinder 36 by the brake fluid, which pressure forces the closure element 10 downwards in FIG. 14. Furthermore, a shoulder 302 on which the closure element 10 is supported via a seal 22 is formed in the housing 30. The seal 22 seals the pressure space of the brake cylinder 36 from the outside.

FIG. 15 shows a sectional view corresponding to FIG. 14 of the closure element 10. The closure element 10 has a recess 11 on its outside. The recess serves for weight reduction and can alternatively also be differently formed or omitted. Compared with known closure elements, it has the advantage that it is visually more pleasing and, owing to the lack of a necessity for engagement sections for assembly tools, gives rise to no danger of injury. The closure element 10 has a groove 13 for accommodating the securing element 21, which groove is formed between an outer wall 12 and a section 14. The external diameter of the outer wall 12 corresponds to the internal diameter of the opening in the housing 30 into which the closure element 10 is inserted. It is therefore not possible to remove the closure element 10 from the outside, because the securing element 21 is not accessible from the outside. The section 14 corresponds to the external diameter substantially to the external diameter of the outer wall 12. The external diameter of the section 15 is slightly smaller than the external diameter of the section 14. The external diameter of the section 15 substantially corresponds to the internal diameter of the opening in the housing 30 against which the closure element 10 rests after mounting. After mounting of the closure element 10, it is therefore also not possible to actuate the securing element 21 from the inside. Thus, after mounting is complete, the closure element 10 cannot be removed from the brake calliper. Since the pistons are designed for a duration of operation which is substantially greater than the duration of operation of the vehicle, there is also no need to remove the closure element 10 again after mounting is complete. The closure element 10 furthermore has a recess 11 for accommodating the sealing element 22.

FIG. 16 shows a side view of the closure element 10 from FIG. 14. The description of FIG. 16 substantially corresponds to that of FIG. 15 and is not repeated here.

For mounting the closure element 10, the closure element 10, together with the securing element 21, is introduced via a funnel device into a sleeve, the internal diameter of which corresponds to the internal diameter of the assembly opening for the brake pistons. The sleeve is mounted on the housing 30, and the closure element 10 is pushed with the securing element 21 into the assembly opening for the brake pistons until the closure element 10 comes up against the seal 22. At the same time, the securing element 21 enters the region of the recess 301. The securing element 21 is a circlip which is prestressed and springs into the recess 301. Half of the securing element 21 is arranged in the recess 301 and the other half in the groove 37 of the securing closure element. The securing element 21 secures the closure element 10 in the assembly opening 29.

The invention claimed is:

1. Combination: comprising, in combination: a brake caliper comprising a housing for accommodating brake linings which grip a brake disc during braking, the housing having an abutment area for contact with the brake linings during braking in the forward direction of travel and an assembly opening which is opposite the abutment area and through which the brake linings can be inserted into the housing, a brake lining securing device for securing the brake linings in the housing on the side opposite the abutment area, a brake lining support device for supporting the brake linings between the abutment area and the brake lining securing device, and a prestressing device prestressing a brake lining inserted into the housing in a defined position; and a fork base, wherein the brake calliper is arranged above the lower edge of the fork base, and wherein the housing of the brake calliper has one or more brake cylinders and at least two screw-on eyes which are arranged so that the brake cylinder or cylinders lie between the screw-on eyes viewed in the circumferential direction of a brake disc arranged in the brake calliper.

2. Combination according to claim 1, wherein the prestressing device prestresses a brake lining inserted into the brake calliper against the abutment area and/or the brake lining support device.

3. Combination according to claim 1, wherein the prestressing device is formed so that it exerts, on a brake lining inserted into the brake calliper, a force which is substantially in the direction of the brake lining support device.

4. Combination according to claim 1, characterized in that the prestressing device comprises at least one spring device which grips the top of a brake lining inserted into the housing.

5. Combination according to claim 1, wherein the prestressing device comprises a leaf spring which grips the top of a brake lining inserted into the housing.

6. Combination according to claim 1, wherein the prestressing device comprises a plurality of leaf springs which in each case grip a brake lining inserted into the housing.

7. Combination according to claim 1, wherein the prestressing device is arranged in the circumferential direction of a brake disc accommodated in the housing, approximately in the middle between the abutment area and the brake lining securing device.

8. Combination according to claim 1, wherein the brake lining support device is formed so that a brake lining inserted into the housing is prestressed in the direction of the abutment area by the force exerted by the prestressing device on the brake lining.

9. Combination according to claim 1, wherein the prestressing device exerts, on a brake lining inserted into the brake calliper, a force which is substantially in the direction of the abutment area.

10. Combination according to claim 9, wherein the prestressing device comprises at least one spring device which engages the brake lining on that side of a brake lining inserted into the brake calliper which is opposite the abutment area.

11. Combination according to claim 9, wherein the abutment area is inclined so that a brake lining prestressed against the abutment area is prestressed against the brake lining support device.

12. Combination according to claim 1, wherein the prestressing device exerts, on a brake lining inserted into the brake calliper, a force which has a first force component which is substantially in the direction of the brake lining support device and a second force component which is substantially in the direction of the abutment area.

13. Combination according to claim 12, wherein the first force component is about twice the second force component.

14. Combination according to claim 1, wherein the prestressing device is formed so that it is deactivated on actuation of the brake.

15. Combination according to claim 14, wherein the brake calliper comprises a hydraulic brake actuation mechanism, and the prestressing device is formed so that it is deactivated by the hydraulic pressure built up during actuation of the brake.

16. Combination according to claim 1, wherein the brake lining support device comprises a plurality of bolts which in each case support a brake lining inserted into the housing.

17. Combination according to claim 1, wherein the brake lining support device comprises a plurality of projections which in each case support a brake lining inserted into the housing.

18. Combination according to claim 17, wherein the plurality of projections are formed integrally with the housing.

19. Combination according to claim 1, wherein the brake lining support device is arranged in the circumferential direction of a brake disc accommodated in the housing, approximately in the middle between the abutment area and the brake lining securing device.

20. Combination according to claim 1, wherein the brake lining support device and the prestressing device are arranged in the circumferential direction of a brake disc accommodated in the housing, substantially approximately at the same height.

21. Combination according to claim 1, wherein the housing is a forged part in the form of a single part.

22. Combination according to claim 1, wherein the housing is a milled and/or cast part which is formed as a single part, as two parts or as a plurality of parts.

23. Combination according to claim 1, wherein the housing has a recess engaged by a projection of a brake lining inserted into the housing.

24. Combination according to claim 1, wherein the housing has at least one inspection window engaged by a projection of a brake lining inserted into the housing, wherein the at least one inspection window allows observing wear of the friction linings of a brake lining inserted into the housing is observable.

25. Combination according to claim 1, wherein the brake lining securing device comprises a bolt for securing the brake linings in the housing on the side opposite the abutment area, and wherein the brake lining securing device furthermore comprises a bow which secures the bolt to prevent it from slipping out and which grips behind a section of the housing for securing the bow.

26. Combination according to claim 25, wherein the bolt has, at one end, a groove engaged by the bow.

27. Combination according to claim 26, wherein the bow has an arm section which has an arc section which engages the groove of the bolt.

28. Combination according to claim 25, wherein the bolt has a groove at each of the two ends, and wherein the bow has two arm sections which in each case has an arc section which engages the corresponding groove of the bolt.

29. Combination according to claim 25, wherein the bolt has a groove at one end and a bore at its other end, and the bow has an arm section, which has an arc section which engages a groove of the bolt and an engagement section which engages a bore of the bolt.

30. Combination according to claim 25, wherein the housing comprises a cam behind which the bow engages for securing the bow.

31. Combination according to claim 1, having a recess for support on the brake lining support device.

32. Combination according to claim 31, wherein the recess is formed so that the brake lining inserted into the housing is prestressed in the direction of the abutment area by the force exerted by the prestressing device on the brake lining.

33. Combination according to claim 31, wherein the recess is semi-circular.

34. Combination according to claim 31, wherein the recess has a bevel which is formed so that the brake lining inserted into the housing is prestressed in the direction of the abutment area of the force exerted by the prestressing device on the brake lining.

35. Combination according to claim 34, wherein the bevel is linear and has an angle of about 30 degrees to the circumferential direction of the brake disc.

36. Combination according to claim 34, wherein the bevel is curvilinear and has an inclination in an angle range between about 30 degrees to the circumferential direction of the brake disc.

37. Combination according to claim 31, wherein the brake lining has a projection for engaging a recess in the housing of a brake calliper.

38. Combination according to claim 37, wherein the projection is arranged on one side of the brake lining.

39. Combination according to claim 37, wherein the projection is arranged substantially centrally, in the upper region of the brake lining.

40. Combination according to claim 1, having a plurality of brake linings.

41. Combination according to claim 1, wherein the brake calliper is arranged on the fork base swivelled upwards at an angle relative to the horizontal.

42. Combination according to claim 1, wherein the housing of the brake calliper is a forged, milled and/or cast part.

43. Combination according to claim 1, wherein the fork base has an edge accommodating the housing of the brake calliper between the screw-on eyes, with the edge corresponding substantially to the contour of the housing.

44. Combination according to claim 1, wherein the housing of the brake calliper and the fork base are formed so that, in the assembled state, there is extensive contact between the opposite surfaces of the housing and of the fork base.

45. Combination according to claim 1, wherein the brake calliper is formed as part of a brake having a brake disc which has a diameter of less than about 280 mm.

46. Combination according to claim 1, wherein the brake calliper is formed as part of a brake for a motocross motorcycle.

* * * * *